(12) United States Patent
Miyahara et al.

(10) Patent No.: US 6,334,878 B1
(45) Date of Patent: Jan. 1, 2002

(54) APPARATUS AND METHOD FOR CRYSTALLIZATION

(75) Inventors: Ichiro Miyahara; Tatsuo Kitamura; Masato Yokoyama; Takashi Koko, all of Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/384,578

(22) Filed: Aug. 27, 1999

Related U.S. Application Data

(63) Continuation of application No. PCT/JP98/00738, filed on Feb. 24, 1998.

(30) Foreign Application Priority Data

Feb. 27, 1997 (JP) .................................... 9-043129

(51) Int. Cl.[7] ...................................... C30B 7/08
(52) U.S. Cl. .................. 23/295 R; 23/301; 23/302 R; 422/245.1; 422/253
(58) Field of Search ............... 422/245.1, 253; 23/295 R, 301, 302 R

(56) References Cited

U.S. PATENT DOCUMENTS

| | | | | |
|---|---|---|---|---|
| 1,610,307 A | * | 12/1926 | Nash ............................ | 422/245.1 |
| 3,900,292 A | * | 8/1975 | Fairchild ....................... | 23/273 R |
| 3,961,904 A | * | 6/1976 | Bennett ........................ | 23/273 R |
| 4,056,364 A | * | 11/1977 | Dmotrivsky et al. ......... | 23/273 R |
| 4,798,131 A | * | 1/1989 | Ohta et al. .................... | 422/135 |
| 6,063,927 A | * | 5/2000 | Craig et al. ................... | 546/197 |

FOREIGN PATENT DOCUMENTS

| | | |
|---|---|---|
| JP | 55-97203 | 7/1980 |
| JP | 59-193101 | 11/1984 |
| WO | 93/19826 | * 10/1993 |

* cited by examiner

*Primary Examiner*—Robert Kunemund
(74) *Attorney, Agent, or Firm*—Oblon, Spivak, McClelland, Maier & Neustadt, P.C.

(57) ABSTRACT

An apparatus for crystallization, which contains a crystallization vessel, a seed supplying device, a feed solution supplying device and a tube baffle disposed within the crystallization vessel. The tube baffle is provided with a crystallization portion in an inner area and a lower area thereof, and the tube baffle and the crystallization vessel define a classification portion there between. The apparatus further contains an agitating fan for agitating the seed crystals and the feed solution, and a plurality of plate baffles disposed within the classification portion which define a buffer portion and a gravitational settling portion. The apparatus further contains a device for generating a rising velocity of a slurry containing fine crystals in the gravitational settling portion by discharging the slurry so that the rising velocity of the slurry is greater than a settling velocity of the fine crystals and an outlet for discharging the crystallized material.

14 Claims, 4 Drawing Sheets

APPARATUS AND METHOD FOR CRYSTALLIZATION

This application is a continuation of PCT/JP98/00738 filed Feb. 24, 1998.

BACKGROUND OF THE INVENTION

1. Field of the Invention

The present invention relates to an apparatus and a method for crystallization, and, in particular, to an apparatus and a method which can produce large crystals by removing fine crystals by classification.

2. Description of the Background

In the field of crystallization, an apparatus for crystallization is known which can produce crystals having relatively large particle diameters by removing fine crystals using a classification. For example, a draft-tube baffled (DTB) crystallizer, and a Krystal-Oslo crystallizer are known.

A conventional DTB crystallizer is described below with reference to FIG. 1. Reference numeral 1 designates a DTB vessel, and draft tube 2 is disposed across an entire center area within DTB vessel 1. Agitating fan 4 is disposed under draft tube 2, and fan 4 is rotatably driven through shaft 6 by motor 8 provided on DTB vessel 1. The lower portion of the center area of the DTB is open so as to enable it to work as baffle. Outer cylindrical portion 12 is provided at the outer side of the baffle portion 10 of DTB vessel 1 and doughnut-type classification portion 14 is defined between the baffle portion 10 and outer cylindrical portion 12. Classification leg 16 is connected with the lower portion of DTB vessel 1 so as to make the particle diameters of the product crystals uniform.

Steam outlet 18 is provided at the upper portion of DTB vessel 1 and connected with a vacuum pump (not shown) so that the inside of DTB vessel 1 can be adjusted to be less than a predetermined pressure. Classification portion outlet 20 is provided on outer cylindrical portion 12 at the upper portion of classification portion 14, and slurry inlets 22 and 24 are respectively provided on the lower portion of DTB vessel 1 and the lower end of classification leg 16. A slurry recovered from classification portion outlet 20 is heated by a heat-exchanger (not shown), dissolved and fed into the inside of the DTB vessel 1 from the inlets 22 and 24. Slurry outlet 26 is provided at the lower portion of the classification leg 16, and the slurry containing crystals with predetermined particle diameters is discharged from slurry outlet 26.

In the conventional DTB crystallizer of FIG. 1, the slurry fed into the inside of DTB vessel 1 from slurry inlets 22 and 24 is forced to go upward in draft tube 2 by agitating fan 4, is then condensed on an evaporation surface 28 which is a slurry surface, and is forced to go downward along the outer side of draft tube 2 and then circulated inside and outside of draft tube 2. Thus, the crystallization is carried out inside and outside of draft tube 2 so that crystallization portion 30 is formed. The classification is carried out by using the settling in the classification portion 14, and the fine crystals are recovered at classification portion outlet 20. The crystals whose particle diameters are greater than a predetermined value still remain and continue to grow in DTB vessel 1.

Further, since conventional DTB crystallizers can not agitate and circulate the slurry when the slurry contains crystals with large particle diameters, another type of DTB crystallizer has been more recently developed which is provided with another agitating fan disposed outside of the draft tube in addition to the agitating fan disposed inside of the draft tube.

However, since conventional DTB crystallizers agitate the slurry so as to allow no influence from the agitated flow to the classification portion, the crystallization area located in the bottom portion of the DTB vessel can not be sufficiently agitated when the slurry contains crystals with large particle diameters. This is a significant problem which occurs when conventional DTB crystallizers crystallize slurries containing crystals with large diameters.

Further, when the slurry needs to be strongly agitated, such as when the slurry is highly concentrated or the slurry needs to be perfectly mixed, it is more difficult to sufficiently agitate the crystallization area in the vessel. In such a case, since the concentration of the slurry in the crystallization area located in the bottom portion of the vessel becomes high, crystals are deposited which readily causes undesired scalings thereof.

On the contrary, if the slurry is strongly agitated so as to avoid the scaling of the crystals, the classification portion is influenced by the agitation effects and, therefore, it becomes impossible to obtain the classification effects. Thus, it has been difficult to avoid both problems.

SUMMARY OF THE INVENTION

Accordingly, it is an object of the present invention to provide an apparatus and a method for crystallization which produce crystals with relatively large particle diameters from a slurry by taking out fine crystals from the slurry using a classification, even when the slurry needs to be strongly agitated, such as when the slurry is highly concentrated or the slurry needs to be perfectly mixed.

The above and other objects are achieved according to the present invention by providing an apparatus for crystallization containing a crystallization vessel, device configured to supply seed crystals of material to be crystallized into the crystallization vessel, device configured to supply feed solution of the material being dissolved into the crystallization vessel, a tube baffle disposed within the crystallization vessel and provided with an opening at a lower side thereof, the tube baffle being provided with a crystallization portion in an inner area and a lower area thereof, the tube baffle and the crystallization vessel defining a classification portion there between, device configured to agitate the seed crystals and the feed solution in a predetermined direction in the crystallization portion, a plurality of buffers disposed within the classification portion so that the buffers vertically extend from the lower end of the classification portion to a predetermined height and are respectively spaced at a predetermined distance from each other, the buffers defining a buffer portion therebetween and a gravitational settling portion thereabove, a classification portion outlet disposed so as to communicate with the upper portion of the gravitational settling portion in the classification portion, device disposed to generate a rising velocity of a slurry containing fine crystals in the gravitational settling portion by discharging the slurry from the classification portion outlet so that the rising velocity of the slurry is equal to or greater than a settling velocity of the fine crystals to be discharged, and device disposed at a lower portion of the crystallization vessel for discharging the crystallized material.

DETAILED DESCRIPTION OF THE PREFERRED EMBODIMENTS

Figure 1:
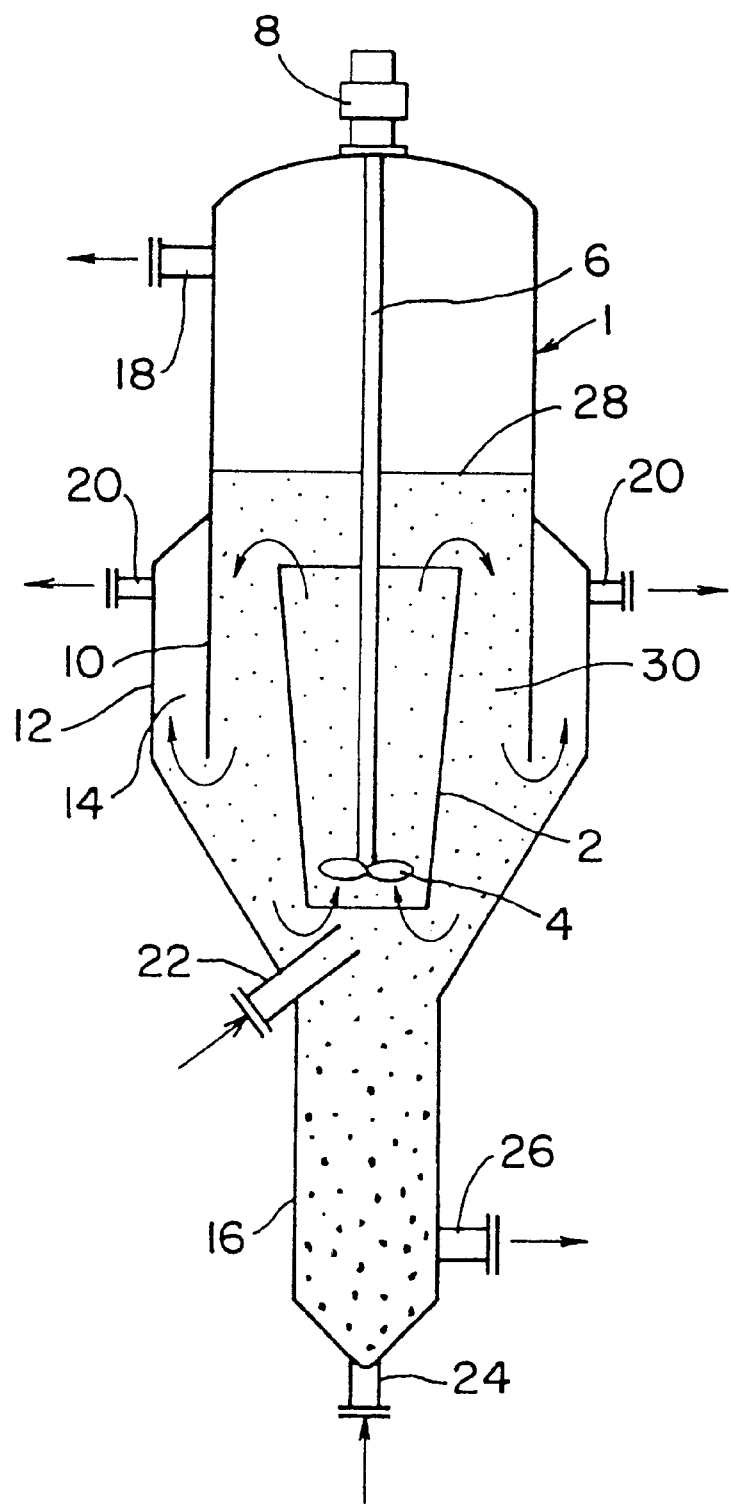
FIG. 1 is a schematic sectional front view illustrating a conventional DTB crystallizer.

In addition to the general description above, the present invention has several preferred embodiments which will now be discussed in detail.

In a preferred embodiment of the present invention, the agitating device may include, for example, an agitating fan disposed at a bottom portion of the crystallization vessel.

In another preferred embodiment of the present invention, the agitating device may include a first agitating fan disposed at a vertically center portion of the tube baffle and a second agitating fan disposed at a bottom portion of the crystallization vessel.

In a still another preferred embodiment of the present invention, the buffers may be a plurality of plate baffles.

In one more preferred embodiment of the present invention, the buffers may have a ratio of a height thereof to a distance therebetween which is about 0.7–1.7.

In yet another preferred embodiment of the present invention, the buffers may have a ratio of a height thereof is to a distance therebetween which is about 1.0–1.5.

In one more preferred embodiment of the present invention, the material to be crystallized may be an amino acid or a salt thereof.

According to the present invention, the slurry containing fine crystals discharged from the classification portion outlet may be changed into super-saturated liquid by being heated and dissolved, condensed, or cooled down and further processed, and thereafter the super-saturated slurry is returned back to the crystallization vessel. In this case, a concentration of the feed solution is preferably equal to or less than that of the saturated concentration of the material or slurry to be crystallized. When the slurry is not returned back to the crystallization vessel, the feed solution is preferably super-saturated.

According to the present invention, the buffer portion is provided in the classification portion by disposing the plurality of buffers so that the classification portion is not influenced by the agitated flow. As a result, since the gravitational settling portion located above the buffer portion is not influenced by the agitated flow, the classification can be sufficiently carried out by generating the rising velocity of the slurry containing fine crystals in the gravitational settling portion by taking out or discharging the slurry from the classification portion outlet communicating with the upper portion of the classification portion so that the rising velocity of the slurry is equal to or greater than the settling velocity of fine crystals. According to the present invention, by using this buffer function and classification function, the fine crystals can be classified and taken out of or discharged with high a result can be classification the crystals crystallized.

According to another aspect of the present invention, there is provided a method for crystallization using a crystallizer containing a crystallization vessel and a tube baffle disposed within the crystallization vessel and provided with an opening at lower side thereof, the tube baffle being provided with a crystallization portion in an inner area and a lower area thereof, the tube baffle and the crystallization vessel defining a classification portion there between, the method entailing the steps of preparing a plurality of buffers disposed within the classification portion so that the buffers vertically extend from the lower end of the classification portion to a predetermined height and are respectively spaced at a predetermined distance from each other, the buffers defining a buffer portion therebetween and a gravitational settling portion thereabove, supplying seed crystals of material to be crystallized into the crystallization vessel, supplying feed solution of the material into the crystallization vessel, agitating the seed crystals and the feed solution in a predetermined direction in the crystallization portion, generating a rising velocity of a slurry containing fine crystals in the gravitational settling portion by discharging the slurry from a classification portion outlet disposed so as to communicate with the upper portion of the gravitational settling portion in the classification portion so that the rising velocity of the slurry is equal to or greater than a settling velocity of the fine crystals to be discharged, and discharging the crystallized material from a lower portion of the crystallization vessel.

The above and other objects and features of the present invention will be apparent from the following description by taking reference with accompanying drawings employed for preferred embodiments of the present invention.

The present invention will now be further explained with reference to a preferred embodiment, an example drawings. The preferred embodiment of the present will be explained with reference to FIGS. 2–5.

Figure 2:
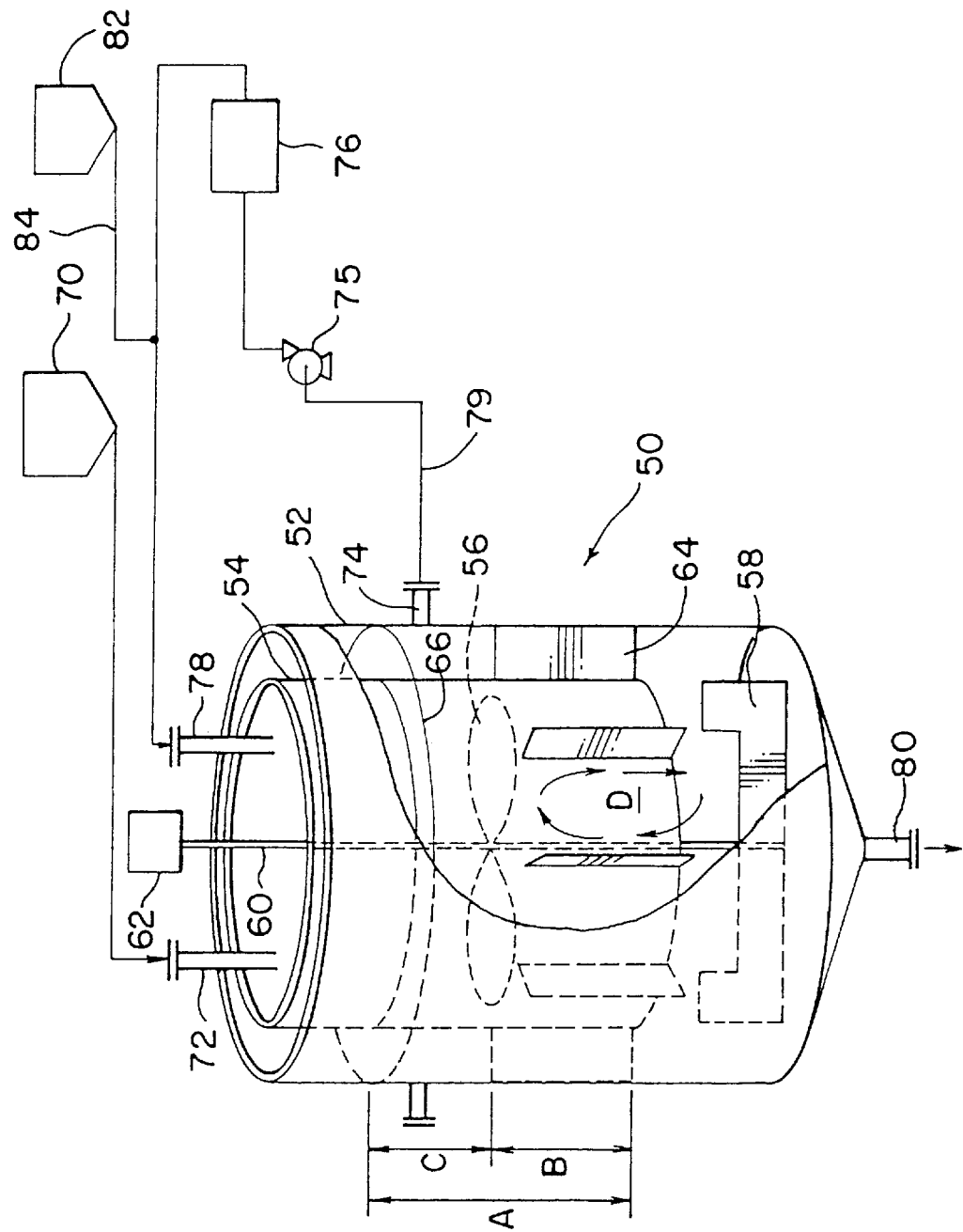
FIG. 2 is a schematic view illustrating an apparatus for crystallization in accordance with a preferred embodiment of the present invention.
Figure 3:
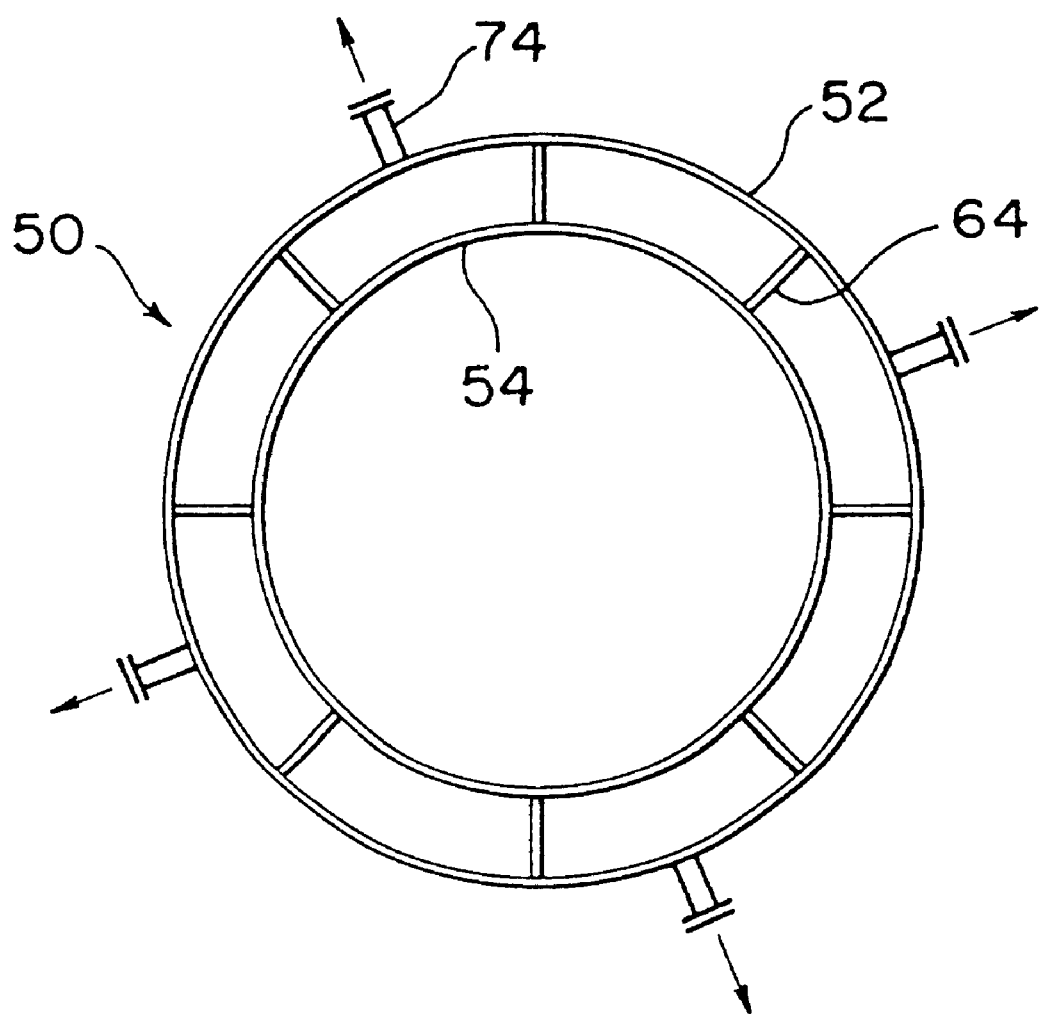
FIG. 3 is a schematic plan view illustrating a crystallization vessel of the apparatus for crystallization of FIG. 2.
Figure 4:
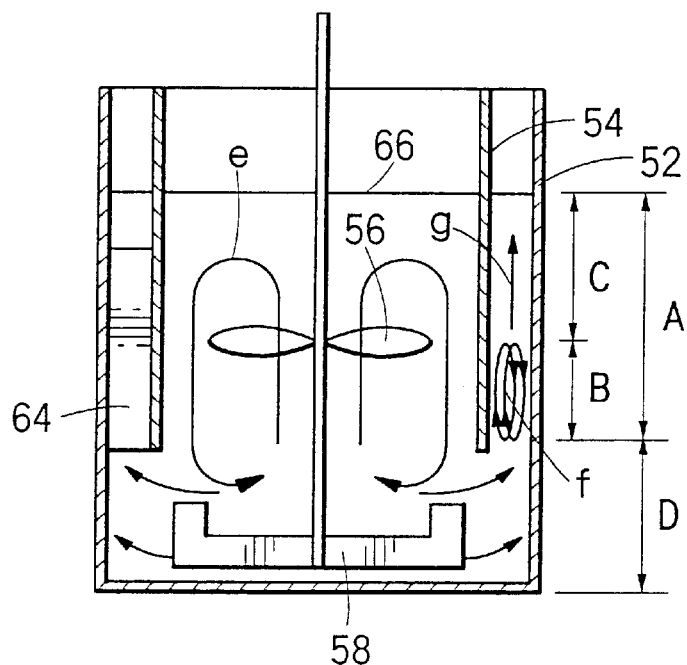
FIG. 4 is a sectional front model view illustrating how the apparatus for crystallization in accordance with the present invention may be operated.

FIG. 2 is a schematic view showing an apparatus for crystallization in accordance with a preferred embodiment of the present invention. FIG. 3 is a schematic plan view showing a crystallization vessel of the apparatus for crystallization of FIG. 2.

Referring to FIGS. 2 and 3, a reference numeral 50 designates an apparatus for crystallization which is provided with a crystallization vessel 52 having a cylindrical shape whose upper end is open and whose lower end is closed. A cylindrical tube baffle 54 whose upper and lower ends are both open is disposed within the crystallization vessel 52. An axial fan or a first agitating fan 56 is disposed at a vertically center area of the tube baffle 54, and a radial fan or a second agitating fan 58 is disposed at the bottom area of the and 58 are attached to a shaft 60 disposed at the center the crystallization vessel 52 and are driven by a motor connected with the upper end of the shaft 60.

A plurality of plate baffles 64 are vertically disposed at the lower portion of the doughnut-type cylindrical area defined by the crystallization vessel 52 and the tube baffle 54. In accordance with the preferred embodiment, the plate baffles 64, of which there are eight, respectively have a predetermined height and are equally spaced at a predetermined distance from each other in a circumferential direction as explained below.

Thus, a classification portion A is located within the doughnut-type cylindrical area and is defined by the crystallization vessel 52, the tube baffle 54 and a liquid surface 66 of the slurry supplied into the crystallization vessel 52. The classification portion A includes a buffer portion B located at the lower portion where the plate, baffles 64 are disposed and a gravitational settling portion C located at the upper portion where the plate baffles 54 are not disposed. Further, a crystallization portion D is located both in the inner area of the tube baffle 54 and the bottom area under the tube baffle 54 in the crystallization vessel 52.

A seed slurry tank 70 storing seed (seed crystals) slurry or dried seeds (seed crystals) is disposed above the crystallization vessel 52, and a seed crystal supply opening 72 through which the seed slurry or the dried seeds in the tank 70 is supplied into the crystallization vessel 52 is also disposed above the opening of the crystallization vessel 52.

Four classification portion outlets 74 are respectively provided at the upper portion of the gravitational settling portion C of the classification portion A of the crystallization vessel 52. The classification portion outlets 74 are connected with a pump 75 and a heat-exchanger 76, both of which are disposed outside of the crystallization vessel 52. Further, a feed supply inlet 78 is provided above the opening of the crystallization vessel 52, and a circulating path 79 of the classified slurry is provided from the classification portion outlets 74 to the feed supply inlet 78. The slurry containing fine crystals is changed into super-saturated liquid by being sucked by the pump 75, heated and dissolved by the heat-exchanger 76, condensed, or cooled down or pH-adjusted and further processed, and thereafter the super-saturated liquid or slurry is returned back to the crystallization vessel 52 so that a necessary amount of crystals can be produced. As shown in FIG. 2, a feed solution supply source 82 is connected through a feed solution supply path 84 with the circulating path 79 at the point between the heat-exchanger 76 and the feed supply inlet 78. The feed solution is also supplied into the crystallization vessel 52 from the feed supplying inlet 78 through feed solution supply path 84. The feed solution is also super-saturated liquid. In accordance with the preferred embodiment of FIG. 2, the feed solution is supplied into the crystallization vessel 52 from the feed supply inlet 78 through the feed solution supply path 84. The feed solution may be supplied into the crystallization from other portions other than the feed supply inlet 78 and the feed solution supply path 84 may be connected with any other portions of the circulating path 79.

A slurry outlet 80 is disposed at the center of the lower end of the crystallization vessel 52.

An operation of the apparatus for crystallization of the preferred embodiment of the present invention will be explained in accordance with FIGS. 2–5. The seed slurry stored in the seed slurry tank 70 is supplied through the supply inlet 72 into the crystallization vessel 52. As shown, by an arrow e in FIG. 4, the slurry including the feed solution in the crystallization vessel 52 is made to go upward along the center portion of the tube baffle 54 and then downward along the outer portion in the inner area of the tube baffle 54 by the first agitating fan 56.

Figure 5:
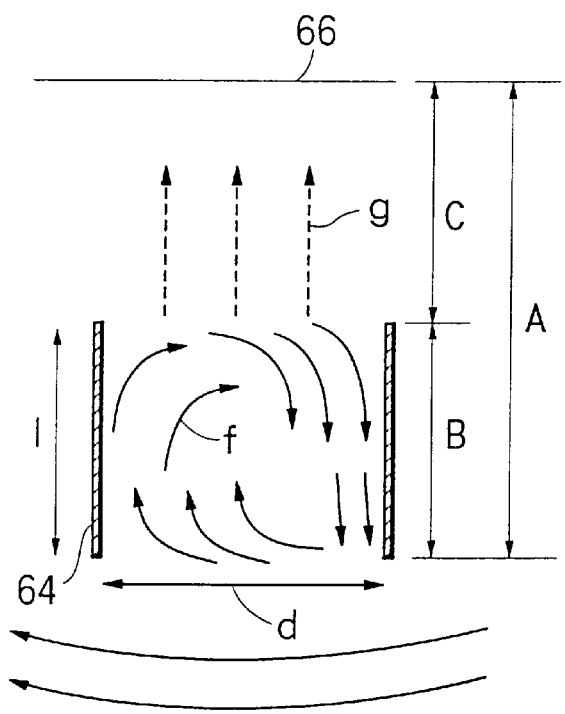
FIG. 5 is an enlarged exploded front view of a classification portion of the apparatus for crystallization in accordance with the present invention.

Next, the slurry is agitated by the second agitating to flow radially outward, and then the slurry classification portion A and a circular flow f in the buffer portion B as shown in FIG. 5. Namely, the slurry which flows into the buffer portion B bumps against the plate baffles 64 to cause a rising flow of the slurry. As the slurry goes upward, the rising flow of the slurry is buffered so that the influence of the agitated flow decreases. Thus, the slurry goes downward after loosing the rising flow. As a result, the crystals in the slurry are forced to be discharged toward the crystallization portion D. The greater the circular flow f generated in the buffer portion B becomes, the greater the distance d between the plate baffles 64 becomes or the smaller the number of the plate baffles 64 becomes. Further, in order to decrease the influence of the agitated flow, the height l of the plate baffle 64 needs to be greater than that of the circular flow f.

At this time, the gravitational settling portion C is not influenced by the agitating flow. A slowly rising flow g is generated in the gravitational settling portion C by the slurry being taken out of or sucked at the classification portion outlet 74 by the pump 75. The rising velocity of the flow g in the gravitational settling portion C is set to be equal to or greater than the settling velocity of the fine crystals so that the classification is carried out. The containing fine crystals taken out from the classification portion outlet 74 is changed into the super-saturated liquid by being heated and dissolved by the heat-exchanger 76, condensed, or cooled down or pH-adjusted and further processed and thereafter the super-saturated liquid or slurry is returned back to the crystallization vessel 52 from the supply inlet 78 so that a necessary amount of the crystals is produced.

Thus, the slurry is crystallized and the crystals having particle diameters which are greater than the predetermined values are deposited to grow in the crystallization portion D within the crystallization vessel 52. Thereafter, the crystals are discharged from the slurry outlet 80 disposed at the center of the lower end of the crystallization vessel 52.

The classification portion A is designed so as to sufficiently perform a classification function by using a buffer function and a gravitational settling function. Namely, after an outer configuration of the crystallization vessel 52 and a diameter and a height of the tube baffle 54 are selected, a height of the gravitational settling portion C is selected so as to sufficiently perform a classification function by using a gravitational settling function, and then a height of the buffer portion B which corresponds to a height of the plate baffle 64 is selected. After the height of the buffer portion B is selected, a number of the plate baffle 64 or a distance d between the plate baffles 64 is selected so that a height of the circular flow f becomes less than or equal to that of the buffer portion B.

Next, how the height of the classification portion A, a height of the buffer portion B. a height of the gravitational settling portion C, an outer configuration of the crystallization vessel 52, a diameter and a height of the tube baffle 54, a number and a height of the plate baffle 64, and a distance between the crystallization vessel and the tube baffle are selected will be explained more specifically.

(1) In connection with particle diameters of the crystals to be classified in the gravitational settling portion C of the classification portion A, a desired rising of the slurry and a height of the gravitational settling portion C are experimentally determined as explained below. In order to determine the height of the settling portion C, the desired rising velocity of the slurry needs to be determined. A settling velocity u particle can be obtained by following general formulas for the settling velocity, when the particle is spherical. However, since spherical particles are rare, the settling velocities in the respective particle diameters of the crystals are measured and empirical formulas are obtained crystals having various diameters into the slurry to be crystallized. By using the obtained empirical formulas, the desired rising velocities in the respective particle diameters of the crystals to be classified are determined.

General formulas for the settling spherical particles are as follows:

$$u = g(\rho_p - \rho)D_p^2/18\rho \qquad Re \leq 2$$

$$u = \{4g^2(\rho_p - \rho)^2 D_p^3/225\mu\rho\}^{1/3} \quad 2 < Re \leq 500$$

$$u = \{3.03g(\rho_p - \rho)D_P/\rho\}^{1/2} \qquad 500 < Re \leq 10^5$$

where u is a settling velocity of a single particle; $\rho_p$ is a particle density; $D_P$ is a particle diameter; $\mu$ is a fluid viscosity coefficient; g the acceleration of gravity; and Re is the Reynolds number.

The settling velocities in various particle diameters of the crystals to be classified are obtained by determining coefficients based on the experiment results by using these empirical formulas and the method of least square. Where the rising velocity of the slurry is equal to the obtained settling velocity, the crystals having particle diameters which are equal to or less than particle diameters of crystals to be classified can be classified.

In accordance with the present invention, a tube whose length was one meter and whose diameter was three centimeters was prepared, a slurry which was to be crystallized was used, the slurry was taken out of by means of the rising velocity calculated by the above mentioned manner, a plurality of sampling openings were vertically provided with the spaces of 10 centimeters, the slurry densities and the particle size distribution of the samples obtained from the sampling openings were analyzed, and then the height of the gravitational portion which was necessary to classified particle diameters of the crystals was experimentally determined.

(2) Next, based on a necessary volume for crystallization, an outer configuration of the crystallization vessel and a diameter and a height of the tube baffle are determined. At this time, the heights of the crystallization vessel and the tube baffle are calculated based on the height of the liquid surface within the crystallization vessel.

(i) The height of the tube baffle is determined. The height of the buffer portion B is set equal to that of the gravitational settling portion C obtained in the manner explained in (1). Therefore, the height of the tube baffle is determined as follows:

(Height of tube baffle)=(height of gravitational settling portion)+(height of buffer portion).

(ii) The diameter of the tube baffle is determined so that the volume of the tube baffle is equal to the volume which is necessary for the crystallization.

(iii) The diameter of the crystallization is determined. The sectional area of the doughnut-type classification portion shown in FIG. 3 is obtained by the taken out or discharge amount of the classified slurry being divided by the rising velocity of the slurry in the classification portion as shown in the following equation. After being discharged, the classified slurry is changed into the super-saturated liquid by being heated and dissolved by the heat-exchanger, condensed, or cooled down or pH-adjusted and further processed and then the supersaturated liquid or slurry is returned back to the crystallization vessel 52. Therefore, the discharge amount of the classified slurry is determined so that the amount of super-saturated liquid necessary to produce the desired amount of crystals can be obtained.

(Sectional area of classification portion)=(Discharge amount of classification slurry)/(rising velocity of slurry in classification portion).

Then, the diameter of the crystallization vessel is determined after the sectional area of the crystallization vessel is obtained by the following equation:

(Sectional area of crystallization)=(sectional of tube baffle)+(sectional of classification portion).

(iv) The height of the crystallization vessel determined so that the ratio of the diameter of the crystallization vessel to the height of the liquid surface in the crystallization vessel is about one, in consideration of the fact that the slurry can be sufficiently agitated in the crystallization vessel.

(v) The volume of the crystallization portion is the total of the inner area of the tube baffle and the lower area of the crystallization vessel which is located under the tube baffle. However, the volume of the crystallization portion becomes greater than the necessary volume when the volume of the crystallization portion is obtained in the above mentioned manner. Therefore, the following adjustment of the volume of the crystallization portion is necessary. The diameters of the tube baffle and the crystallization vessel are made smaller while satisfying the conditions of (iii), and then the volume of the crystallization portion is adjusted to be equal to the necessary volume by shortening the height of the crystallization vessel while satisfying the conditions of (iv).

(3) The height and number of the plate baffle are determined.

(i) The height of the plate baffle is determined to be equal to the height of the buffer portion so that the plate baffles can be disposed in the buffer portion to buffer 0 the agitated flow.

(ii) The number of the plate baffles is determined. The necessary agitating power per unit volume (Pv) for agitating the slurries of amino acid, nucleic acid and derivatives thereof is experientially about 0.05–0.5 ($KW/m^3$). Under this agitating condition, it is experimentally determined that the ratio of (l/d), where l and d are respectively the height and the width of the circular flow f generated within the area enclosed by two plate baffles as shown in FIG. 5, is about 0.7–1.7, preferably about 1.0–1.5. Since it is necessary to make the height of the circular flow lower than that of the buffer portion or the plate baffle, the space between the plate baffles is determined by using the height of the plate baffle determined at (i) and the experimentally determined ratio of (l/d) as follows:

(Space between plate baffles)=(height of plate baffle)/(the ratio of height l to width d of circular flow).

Then, the number of the plate baffles is determined as follows:

(Number of plate baffles)=(circumference length of crystallization vessel)/(space between plate baffles).

However, the space between the plate baffles might be too small to manufacture an actual apparatus when employing the number of the plate baffles determined by the above manner. In this case, in order to solve the problem, the space between the plate baffles may be increased by increasing the height of the buffer portion determined in the manner of (2)(i).

(4) The space between the crystallization vessel and the tube baffle is not specified in the present invention. However, the ratio of the height of the plate baffle to the space between the crystallization vessel and the tube baffle is preferably equal to or less than 1.5.

However, if the space between the crystallization vessel and the tube baffles is too small to manufacture an actual apparatus, the diameter of the tube baffle is decreased, the diameter of the crystallization vessel is determined while satisfying the conditions of (2)(iii), and the space between the crystallization vessel and the tube baffle is increased.

In the accordance with the present invention, a supersaturated slurry may be supplied through from a supply inlet into a crystallization vessel and the slurry is crystallized and/or a crystallization vessel may be cooled down and a slurry is crystallized. Further, the crystallization vessel may be vacuumed and the crystallization may be carried out under the vacuum condition. Moreover, the crystallization may be carried out by employing a chemical reaction.

The present invention will now be further illustrated by reference to an example which is provided solely for purposes of illustration and is not intended to be limitative.

EXAMPLE

The apparatus for crystallization in accordance with the present invention was applied to slurry containing sodium glutamate, and the sodium glutamate was continuously crystallized. The particle diameter of the crystals to be classified was 300 micrometers, and the respective values of the components of the apparatus for crystallization were determined based on the manners explained above. Namely, the crystallization vessel 52 had a diameter of 160 mm and a height of 1850 mm, the tube baffle 54 had a diameter of 1200 mm and a height of 1310 mm, the classification portion A had a height of 1090 mm, the buffer portion B had a height of 600 mm, the gravitational settling portion C had a height of 490 mm, the plate baffle 64 had a height of 600 mm and a width (or a radial length of the classification portion) of 200 mm, and twelve of the plate baffles were spaced equally from each other. The first agitating fan 56 was a screw-type fan and the second agitating fan 58 was an anchor-type fan, both of the first and second agitating fans being rotated at 25 rpm.

The slurry containing 10% by weight of sodium glutamate-monohydrate of 3.2 KL was held within the crystallization vessel, the seed crystals having an average particle diameter of 400 $\mu$m were supplied at 3 Kg/hour, and the slurry of 0.15 KL/hour was discharged from the slurry outlet 80. The classified slurry of a total of 8.0 KL/hour was taken out or discharged from the four classification portion outlets 74, the super-saturated slurry containing 52% by weight of sodium glutamate was supplied at 8.15 KL/hour from the supply inlet 78, and the crystallization was carried out at 60° C.

In the example, the discharged classified slurry contained the crystals of 1.5% by weight of sodium glutamate-monohydrate, and the classified crystals contained 90% by weight of the crystals whose particle diameters were equal to or less than 300 $\mu$m. These results of classification were what we had expected. Further, the upper liquid surface of the gravitational settling portion was continuously constant. The finally discharged slurry contained the crystals of 37% by weight of sodium glutamate-monohydrate, and the average particle diameter of the crystals was 830 $\mu$m which was sufficiently greater than that of the seed crystals.

Having described the present invention, it will now be apparent to one skilled in the art that many changes and modifications can be made to the above-described embodiments while still remaining within the spirit and scope of the present invention.

What is claimed is:

1. An apparatus for crystallization, comprising:
   a) a crystallization vessel;
   b) a device disposed to supply seed crystals of material to be crystallized into the crystallization vessel;
   c) a device disposed to supply feed solution of the material being dissolved into the crystallization vessel;
   d) a tube baffle disposed within the crystallization vessel and provided with an opening at a lower side thereof, the tube baffle being provided with a crystallization portion in an inner area and a lower area thereof, the tube baffle and the crystallization vessel defining a classification portion therebetween, the tube baffle being provided with no draft tube therewithin;
   e) a device disposed to agitate seed crystals and the feed solution at least in a radial direction in the crystallization portion;
   f) a plurality of buffers disposed within the classification portion so that the buffers vertically extend from the lower end of the classification portion to a predetermined height and are respectively spaced at a predetermined distance from each other, the buffers defining a buffer portion therebetween and a gravitational settling portion thereabove, the gravitational settling portion being continuously extended in a circumferential direction,
   g) a classification portion outlet disposed so as to communicate with the upper portion of the gravitational settling portion in the classification portion;
   h) a device disposed to generate a rising velocity of a slurry containing fine crystals in the gravitational settling portion by discharging the slurry from the classification portion outlet so that the rising velocity of the slurry is equal to or greater than a settling velocity of the fine crystals to be discharged; and
   i) a device disposed at a lower portion of the crystallization vessel and configured to discharge the crystallized material.

2. The apparatus of claim 1, wherein the device disposed to agitate the seed crystals includes a radial fan disposed at a bottom portion of the crystallization vessel.

3. The apparatus of claim 1, wherein the device disposed to agitate the seed crystals includes an axial fan disposed at a vertically center portion of the tube baffle and a radial fan disposed at a bottom portion of the crystallization vessel.

4. The apparatus of claim 1, wherein said buffers are a plurality of plate baffles.

5. The apparatus of claim 1, wherein said buffers have a ratio of a height thereof to a distance therebetween which is about 0.7–1.7.

6. The apparatus of claim 5, said buffers have a ratio of a height thereof to a distance therebetween which is about 1.0 to 1.5.

7. The apparatus of claim 1, wherein the material to be crystallized is an amino acid or a salt thereof.

8. A method for crystallization using a crystallizer, comprising:
   a) preparing a crystallization vessel and a tube baffle disposed within the crystallization vessel and provided with an opening at lower side thereof, the tube baffle being provided with a crystallization portion in an inner area and a lower area thereof, the tube baffle and the crystallization vessel defining a classification portion therebetween, the tube baffle being provided with no draft tube therewithin;
   b) preparing a plurality of buffers disposed within the classification portion so that the buffers vertically extend from the lower end of the classification portion to a predetermined height and are respectively spaced at a predetermined distance from each other, the buffers defining a buffer portion therebetween and a gravitational settling portion thereabove, the gravitational settling portion being continuously extended in a circumferential direction;
   c) supplying seed crystals of material to be crystallized into the crystallization vessel;
   d) supplying feed solution of the material into the crystallization vessel;
   e) agitating the seed crystals and the feed solution in a predetermined direction at least in a radial direction in the crystallization portion;
   f) generating a rising velocity of a slurry containing fine crystals in the gravitational settling portion by discharging the slurry from a classification portion outlet disposed so as to communicate with the upper portion of the gravitational settling portion in the classification portion so that the rising velocity of the slurry is equal to or greater than a settling velocity of the fine crystals to be discharged; and
   g) discharging the crystallized material from a lower portion of the crystallization vessel.

9. The method of claim 8, wherein the material to be crystallized is an amino acid or salt thereof.

10. The method of claim 9, wherein the material to be crystallized is sodium glutamate.

11. The method of claim 9, wherein the slurry discharged from the classification portion in step f) comprises crystals having particle diameters of less than or equal to 300 μm.

12. The method of claim 10, wherein the discharged crystalline material of step g) comprises crystals having an average particle diameter of 830 μm.

13. The method of claim 8, which further comprises, after step f), converting the slurry containing fine crystals into a super-saturated slurry, and the thereafter returning the super-saturated slurry to the crystallization vessel, wherein said feed solution of step d) has a concentration which is equal to or less than that of the super-saturated slurry to be crystallized.

14. The method of claim 8, which further comprises, after step f), converting the slurry containing fine crystals into a super-saturated slurry and not returning the super-saturated slurry to the crystallization vessel, wherein the feed solution of step d) is super-saturated.

* * * * *